United States Patent [19]

Shimakawa et al.

[11] 4,446,008

[45] May 1, 1984

[54] PROCESS FOR HYDROCRACKING OF HEAVY OILS WITH IRON CONTAINING ALUMINOSILICATES

[75] Inventors: Hajime Shimakawa; Satoshi Nakai, both of Sodegaura, Japan

[73] Assignee: Research Association for Residual Oil Processing, Tokyo, Japan

[21] Appl. No.: 443,452

[22] Filed: Nov. 22, 1982

[30] Foreign Application Priority Data

Dec. 9, 1981 [JP] Japan .................................. 56-196972
Feb. 10, 1982 [JP] Japan .................................. 57-18917

[51] Int. Cl.³ ...................... C10G 47/20; B01J 29/14; B01J 29/24; B01J 29/34
[52] U.S. Cl. .................................. 208/111; 208/120; 502/74
[58] Field of Search ................................ 208/111, 120

[56] References Cited

U.S. PATENT DOCUMENTS

| | | | |
|---|---|---|---|
| 3,255,101 | 6/1966 | Arey et al. .......................... | 208/111 |
| 3,392,108 | 7/1968 | Mason et al. ........................ | 208/111 |
| 3,493,519 | 2/1970 | Kerr et al. .......................... | 208/120 X |
| 3,549,518 | 12/1970 | Mason et al. ........................ | 208/111 |
| 3,706,694 | 12/1972 | Young ............................... | 208/111 X |
| 4,297,243 | 10/1981 | Moorehead ........................ | 208/111 X |

*Primary Examiner*—Delbert E. Gantz
*Assistant Examiner*—O. Chaudhuri
*Attorney, Agent, or Firm*—Frishauf, Holtz, Goodman & Woodward

[57] ABSTRACT

The invention provides a process for hydrocracking heavy oils in the presence of a catalyst comprising a carrier and metals belonging to the Groups VIB and VIII of the Periodic Table. The carrier consists of from 20 to 80% by weight of iron-containing aluminosilicate and from 80 to 20% by weight of an inorganic oxide. The iron-containing aluminosilicate is prepared by treating steam-treated crystalline aluminosilicate with an aqueous iron salt solution at a pH of 1.5 or less. The molybdenum/iron-containing aluminosilicate can be used in place of the iron-containing aluminosilicate. According to the process of the present invention, the yield of an intermediate fraction can be increased.

13 Claims, 1 Drawing Figure

PROCESS FOR HYDROCRACKING OF HEAVY OILS WITH IRON CONTAINING ALUMINOSILICATES

BACKGROUND OF THE INVENTION

The present invention relates to a process for the hydrocracking of heavy oils. More particularly, it relates to a process for efficiently hydrocracking heavy oils in the presence of a catalyst comprising a carrier and active components deposited on the carrier, said carrier being composed of aluminosilicate subjected to a specific treatment and inorganic oxide, to convert the heavy oils into lighter oils of higher value.

In recent years, there has been a strong upward tendency in production of heavy crude oils all over the world, and further, the demand for petroleum has changed. Thus, presently, lighter oils tend to be in short supply, although heavy oils are supplied in surplus. For this reason, a number of techniques have been developed for the conversion of heavy oils into lighter oils such as naphtha, kerosene, and light oil. Of these techniques, hydrocracking has received increasing attention because it provides lighter oils of good quality.

Conventional hydrocracking methods, however, have various disadvantages—e.g., the yield of an intermediate fraction (corresponding to kerosene and light oil) is low, and the amount of hydrogen being consumed is large.

A catalyst, therefore, has recently been developed in which a specific crystalline aluminosilicate treated with an aqueous solution of iron salt is used as a carrier (see Japanese Patent Application No. 100546/1981). When this catalyst is used in hydrocracking of heavy oils, it can maintain its high activity over long periods of time, because the heat resistance of the catalyst is high and the amount of carbon deposited is small. This catalyst, however, suffers from disadvantages in that the yield of an intermediate fraction is still low and the amount of hydrogen being consumed cannot be greatly reduced to the extent that is satisfactory, although it is slightly reduced compared with the conventional methods.

SUMMARY OF THE INVENTION

An object of the invention is to provide a process for the hydrocracking of heavy oils, which provides for increasing the yield of an intermediate fraction and to greatly reduce the amount of hydrogen consumed.

Another object of the invention is to provide a process for efficiently hydrocracking heavy oils in the presence of a catalyst having a high activity and a prolonged life.

The present invention provides a process for hydrocracking heavy oils in the presence of a catalyst wherein the catalyst comprises (1) a carrier consisting of from 20 to 80% by weight of iron-containing aluminosilicate and from 80 to 20% by weight of an inorganic oxide, said iron-containing aluminosilicate being prepared by treating steam-treated crystalline aluminosilicate with an aqueous solution of iron salt, and (2) metals belonging to the Groups VIB and VIII of the Periodic Table, said metals being deposited on the carrier.

Figure 1:
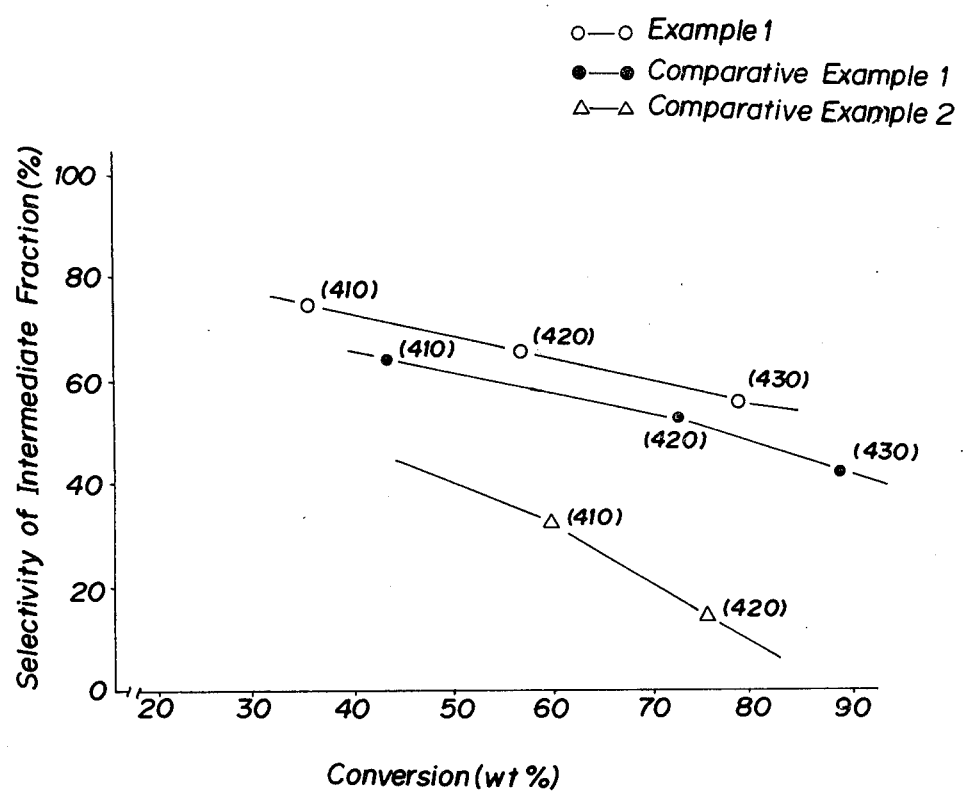
FIG. 1 is a graph showing the relation between the conversion and the selectivity of an intermediate fraction in Example 1 and Comparative Examples 1 and 2.

The numerical values in the brackets mean reaction temperatures.

DETAILED DESCRIPTION OF THE INVENTION

The carrier for the catalyst as used herein is a mixture of iron-containing aluminosilicate and inorganic oxide. This iron-containing aluminosilicate is prepared by treating a starting material, crystalline aluminosilicate, with steam and further, with an aqueous solution of iron salt.

Although the crystalline aluminosilicate used as a starting material is not critical, there is usually used crystalline aluminosilicate in which the ratio of silica to alumina is 4.6/1 or more, and the $Na_2O$ content is 2.4% by weight or less and preferably 1% by weight or less. Typical examples include natural zeolites, e.g., faujasite and mordenite, and synthetic zeolites, e.g., X-type, Y-type, L-type and ZSM-type zeolites. Although any of the zeolites can be suitably used in the invention, it is particularly preferred to use those zeolites having a large effective pore diameter. When crystalline aluminosilicate having the molar ratio of silica to alumina of less than 4.6 or a $Na_2O$ content of more than 2.4% by weight is used as a starting material and it is treated under the strong acidic condition that pH is 1.5 or less, the silicate framework of the aluminosilicate is liable to be broken. When, however, the treatment is performed under the weak acidic condition that pH is more than 1.5, or neutral or alkaline condition, it is not necessary to pay special attention to the molar ratio of silica to alumina and the $Na_2O$ content of the crystalline aluminosilicate.

Crystalline aluminosilicate is first treated with steam. This steam treatment is preferably performed using steam maintained at a temperature of from 540° to 810° C. This steam treatment may be performed with flowing steam, or alternatively the crystalline aluminosilicate may be placed in a closed container and heated to achieve self-steaming with the water held in the aluminosilicate.

Subsequently, the steam-treated crystalline aluminosilicate is treated with an aqueous iron salt solution. In preparing such aqueous iron salt solutions, various iron salts and complex salts can be used. In general, aqueous solutions of ferrous chloride, ferric chloride, ferrous nitrate, ferric nitrate, ferrous sulfate, ferric sulfate, and the like are used. In treating the steam-treated crystalline aluminosilicate with an aqueous iron salt solution, it is preferred that the pH of the system is adjusted to the acidic region, particularly the pH is adjusted to 1.5 or less. If necessary, it is effective to add an acid to the system. Suitable examples of acids which can be used include hydrochloric acid, nitric acid, and sulfuric acid. When the steam-treated aluminosilicate is treated with an aqueous iron salt solution adjusted in pH to 1.5 or less, washed with water, dried, and thereafter, is calcined at a temperature of from 300° to 800° C., part of the aluminum constituting the crystal of aluminosilicate is eluted and replaced by iron, resulting in the formation of a new chemical bond.

Other conditions under which the steam-treated aluminosilicate is treated with an aqueous iron salt solution are not critical and can be determined suitably and optionally. Usually the steam-treated aluminosilicate is brought into contact with the aqueous iron salt solution at a temperature of from 0° to 100° C. for a period of from about 0.5 to 10 hours. For this contacting procedure, it is sufficient to merely dip the crystalline aluminosilicate in the aqueous iron salt solution. When, however, the procedure is performed while stirring, the treatment can be achieved in a short period of time. Although the procedure is sufficient to be performed only once, when it is performed repeatedly, there can be obtained aluminosilicate having a high iron content. In this treatment, it is effective to use supersonic waves.

In accordance with the process of the invention, the above-prepared aluminosilicate is fully washed with water, dried, and calcined at a temperature of from 300° to 800° C. to form the desired iron-containing aluminosilicate, which is mixed with an inorganic oxide to prepare a carrier.

In an embodiment of the invention, the iron-containing aluminosilicate may be further treated with a molybdenum compound and then, the obtained molybdenum/iron-containing aluminosilicate is mixed with an inorganic oxide to prepare the desired carrier. Molybdenum compounds which can be used include molybdic acid salts, molybdenum oxide, molybdenum carbonyl and the like. This treatment can be performed by various techniques and under various conditions. In general, there is employed an impregnating method, a kneading method, or the like, utilizing a solution of molybdenum compound dissolved in water or an organic solvent. When a sublimable molybdenum compound is used, it may be sublimated to achieve the treatment. In the above-described treatment, care must be taken to ensure that the molybdenum compound is dispersed as uniformly as possible.

The amount of the molybdenum compound used can be determined appropriately and optionally. Preferably it is determined so that the MoO$_3$ content of the resulting molybdenum/iron-containing aluminosilicate is from 0.5 to 10% by weight. It is required for the treatment with a molybdenum compound to be performed after the aluminosilicate is treated with an aqueous iron salt solution, but before the metals belonging to the Groups VIB and VIII of the Periodic Table are deposited thereon.

The above-treated aluminosilicate is fully washed with water, dried, and calcined at a temperature of from 300° to 800° C. to obtain the desired molybdenum/iron-containing aluminosilicate.

The iron-containing aluminosilicate or molybdenum/iron-containing aluminosilicate is mixed with an inorganic oxide to form the desired carrier. This inorganic oxide is used to maintain the necessary mechanical strength of the ultimate catalyst and to provide a suitable pore distribution, thereby increasing the function of the catalyst. Any inorganic oxides can be used as long as they meet the above-described requirements. Suitable examples are hydrated oxides such as boehmite gel, alumina sol, and silica-alumina gel.

The weight ratio of the iron-containing aluminosilicate or molybdenum/iron-containing aluminosilicate to the inorganic oxide is from 20/80 to 80/20 and preferably from 40/60 to 70/30. When the proportion of the iron-containing aluminosilicate or molybdenum/iron-containing aluminosilicate is too small, the yield of the intermediate fraction being produced is decreased, whereas when it is too large, the selectivity of the intermediate fraction being produced is decreased, resulting in the increased amount of hydrogen consumed.

As active components to be deposited on the above-prepared carrier are used at least one member selected from the Group VIB metals and at least one member selected from the Group VIII metals. It is essential in the invention for the Group VIB metal and the Group VIII metal to be used in combination with each other. The objects of the invention cannot be attained without using both at least one member of the Group VIB metal and at least one member of the Group VIII metal. Preferred examples of the Group VIB metals are tungsten and molybdenum, and preferred examples of the Group VIII metals are nickel and cobalt.

The amounts of the active components being deposited on the carrier are not critical and can be determined appropriately and optionally. Usually, however, the amount of the Group VIB metal or metals deposited is from 3 to 24% by weight, preferably from 8 to 20% by weight, based on the total weight of the catalyst, and the amount of the Group VIII metal or metals deposited is from 0.7 to 20% by weight, preferably from 1.5 to 8% by weight, based on the total weight of the catalyst.

The active components can be deposited on the carrier by known techniques such as a co-precipitating method, an impregnating method, and a kneading method.

Heavy oils which can be used in the invention include atmospheric distillation residual oil, vacuum distillation residual oil, vacuum heavy light oil, catalytic cracking residual oil, vis-breaking oil, tar sand oil, and shale oil. In addition, base oil for lubricating oil can be used.

In the practice of the process of the invention, broad ranges of reaction conditions including the reaction conditions conventionally employed in hydrocracking can be employed. Usually, however, the reaction temperature is from 350° to 450° C., the reaction pressure is from 50 to 200 kilograms per square centimeter (kg/cm$^2$), the ratio of hydrogen to feed oil is from 500/1 to 5,000/1 normal cubic meters per kiloliter (Nm$^3$-H$_2$/kl-oil), the liquid hourly space velocity (LHSV) is from 0.1 to 10 per hour (hr$^{-1}$), preferably from 0.2 to 1.0 per hour (hr$^{-1}$), and hydrogen having a purity of at least 75 mole% is used.

In accordance with the process of the invention, the heavy oil is subjected to hydrocracking in the presence of the above-described catalyst under the above-described conditions.

Some of the major advantages of the invention are as follows:

The hydrocracking reaction proceeds efficiently, and a large amount of hydrocracked oil can be produced.

The proportion of the intermediate fraction, such as kerosene and light oil, in the hydrocracked oil is high, and further, the intermediate fraction is of such high quality that it can be used as an oil product without any treatment, because its unsaturated and aromatic hydrocarbon contents are low.

The yield of the intermediate fraction produced in accordance with the process of the invention is about 10 percent higher than the yield in the process in which dealuminated zeolite (USY type zeolite) containing no iron, or iron-containing aluminosilicate zeolite not subjected to a steam treatment are used.

The use of the molybdenum/iron-containing aluminosilicate as a component of the carrier further increases the yield of the intermediate fraction.

The amount of hydrogen consumed during hydrocracking can be greatly decreased compared with the conventional processes and, therefore, the process of the invention is very advantageous from an economical standpoint.

The process of the invention can be utilized advantageously in the field of oil refinery.

The following examples are given to illustrate the invention in greater detail.

EXAMPLE 1

(1) Preparation of Catalyst

Y-Type zeolite (100 grams) (Na$_2$O content: 0.4% by weight; SiO$_2$/Al$_2$O$_3$ molar ratio: 5.6/1) was placed in a rotary kiln and was subjected to a self steaming treatment at 680° C. for 3 hours. The loss of the weight due to the treatment was about 20% by weight. Eighty grams of the steam-treated zeolite (hereinafter referred to as "SHY zeolite") and 800 milliliters of an aqueous solution of Fe(NO$_3$)$_3$ (concentration: 0.20 mole per liter (mole/l); pH: 1.0) were placed in a 1-liter three-necked flask and stirred at 50° C. for 2 hours, and then were filtered by suction. The residue obtained was then fully washed with 10 liters of ion exchanged water maintained at 50° C., dried at 80° C. for 3 hours, and subsequently, calcined at 450° C. for 3 hours to form an iron-containing steam-treated zeolite (hereinafter referred to as "Fe-SHY zeolite"). For this Fe-SHY zeolite, the Na$_2$O content was 0.10% by weight, the SiO$_2$/Al$_2$O$_3$ molar ratio was 7.8/1, and the SiO$_2$/Fe$_2$O$_3$ molar ratio was 43.4/1.

An aqueous aluminum chloride solution and 3 times as many moles of an aqueous sodium hydroxide solution were reacted to form an aluminum hydroxide precipitate. The precipitate was then aged at 95° C. for 18 hours, filtered, and washed with water to obtain a boehmite gel.

A mixture of 67 grams of Fe-SHY zeolite and 189 grams of alumina boehmite gel was mixed with 50 milliliters of ion exchanged water and kneaded. After being adjusted to the suitable water content for wet extrusion molding, the kneaded mixture was molded at a molding pressure of 30 kilograms per square centimeter (kg/cm$^2$) to form particles having diameter of 1 millimeter and length of 3 millimeters. The thus-produced particles were then dried at 120° C. for 3 hours, and calcined at 500° C. for 3 hours to obtain a Fe-SHY zeolite/Al$_2$O$_3$ carrier having a Fe-SHY zeolite content of 60% by weight.

The carrier (75 grams) was impregnated with a mixture of 200 milliliters of a concentrated solution of ammonium metatungstate (WO$_3$: 50.0% by weight) and 64 milliliters of an aqueous solution containing 14.9 grams of nickel nitrate, dried at 90° C. for 3 hours, and calcined at 550° C. for 2 hours to prepare a catalyst containing 15.1% by weight of tungsten (as metal) and 2.9% by weight of nickel (as metal). The specific surface area of the catalyst was 378 square meters per gram.

(2) Hydrocracking Reaction

A reaction tube made of stainless steel was charged with 100 milliliters of the above-prepared catalyst, and an atmospheric distillation residual oil (specific gravity: 0.965 (15/4° C.); 343° C.+ 92 vol%; sulfur content; 3.9% by weight) derived from Kuwait crude oil was passed through the reaction tube and hydrocracked under the conditions of a temperature of 410° C., 420° C., or 430° C., a pressure of 100 kilograms per square centimeters, LHSV of 0.5 per hour (hr$^{-1}$), and a hydrogen/oil ratio of 2,000/1 (Nm$^3$/kl-oil). The results are shown in Table 1 and FIG. 1.

COMPARATIVE EXAMPLE 1

(1) Preparation of Catalyst

A dealuminated Y-type zeolite (Na$_2$O content: 0.1% by weight; SiO$_2$/Al$_2$O$_3$ molar ratio: 9.3/1) was prepared in the same manner as in Example 1 except that hydrochloric acid (pH: 1.0) was used in place of the aqueous solution of Fe(NO$_3$)$_3$. Thereafter, the same procedure as in Example 1 was repeated to prepare a catalyst.

(2) Hydrocracking Reaction

Hydrocracking was performed in the same manner as in Example 1 except that the catalyst as prepared in (1) above was used. The results are shown in Table 1 and FIG. 1.

COMPARATIVE EXAMPLE 2

(1) Preparation of Catalyst

A catalyst was prepared in the same manner as in Example 1 except that the steaming treatment was not applied.

(2) Hydrocracking Reaction

Hydrocracking was performed in the same manner as in Example 1 except that the catalyst as prepared in (1) above was used. The results are shown in Table 1 and FIG. 1.

EXAMPLE 2

(1) Preparation of Catalyst

Fe-SHY Zeolite powder (75 grams) as prepared in Example 1 (1) and a slurry of 4.28 grams of molybdenum carbonyl (Mo(CO)$_6$) dissolved in 428 milliliters of acetonitrile were placed in a 1-liter three-necked flask and stirred at 80° C. for 3 hours. The acetonitrile was evaporated by means of a rotary evaporator and, thereafter, the residue was dried at 120° C. for 3 hours, and calcined at 300° C. for 1 hour and further, at 500° C. for 1 hour to prepare a molybdenum/iron-containing steaming zeolite (hereinafter referred to as "Mo-Fe-SHY zeolite"). In this Mo-Fe-SHY zeolite, the Na$_2$O content was 0.1% by weight, the SiO$_2$/Al$_2$O$_3$ molar ratio was 7.3/1, the SiO$_2$/Fe$_2$O$_3$ molar ratio was 40.9/1, and the SiO$_2$/MoO$_3$ molar ratio was 70.7/1.

A mixture of 67 grams of Mo-Fe-SHY zeolite, 189 grams of alumina boehmite gel prepared in Example 1 (1), and 50 milliliters of ion exchanged water was kneaded and adjusted to the suitable water content for wet extrusion molding. It was then molded at a molding pressure of 30 kilograms per square centimeter (kg/cm$^2$) to form particles having diameter of 1 milliliter and length of 3 millimeters, and subsequently, was dried at 120° C. for 3 hours and calcined at 500° C. for 3 hours to form a Mo-Fe-SHY zeolite/Al$_2$O$_3$ carrier having a Mo-Fe-SHY zeolite content of 60% by weight.

The thus-prepared carrier (75 grams) was impregnated with 20.0 milliliters of a concentrated solution of ammonia metatungstate (WO$_3$: 50.0% by weight) and 64 milliliters of an aqueous solution containing 14.9 grams of nickel nitrate, dried at 90° C. for 3 hours, and calcined at 550° C. for 2 hours to prepare a catalyst containing 15.1% by weight of tungsten (as metal) and 2.9% by weight of nickel (as metal). The specific surface area of the catalyst was 394 square meters per gram.

(2) Hydrocracking Reaction

Hydrocracking was performed in the same manner as in Example 1 except that the catalyst as prepared in (1) above was used. The results are shown in Table 1.

EXAMPLE 3

A reaction tube made of stainless steel was charged with 1 liter of the catalyst as prepared in Example 2, and an atmospheric distillation residual oil derived from Kuwait crude oil was passed through the reaction tube and hydrocracked under the conditions of a temperature of 415° C., a hydrogen partial pressure of 135 kilograms per square meter, LHSV of 0.3 per hour ($hr^{-1}$), and a hydrogen/oil ratio of 2,000/1 ($Nm^3$/kl-oil). The results measured after 500 hours from the start of the hydrocracking reaction are shown in Table 2.

COMPARATIVE EXAMPLE 3

(1) Preparation of Catalyst

Molybdenum carbonyl ($Mo(CO)_6$) as a molybdenum component was incorporated into the catalyst as prepared in Example 1 (1) in the same manner as in Example 2 (1) so that the $MoO_3$ content was 1.8% by weight. The specific surface area of the obtained catalyst was 369 square meters per gram.

(2) Hydrocracking Reaction

Hydrocracking was performed in the same manner as in Example 2 (2) except that the catalyst as prepared in (1) above was used. The results are shown in Table 1.

EXAMPLE 4

Hydrocracking was performed in the same manner as in Example 3 except that the catalyst as prepared in Example 1 (1) was used. The results are shown in Table 2.

TABLE 1

| | Example 1 | | | Example 2 | | | Comparative Example 1 | | | Comparative Example 2 | | | Comparative Example 3 | | |
|---|---|---|---|---|---|---|---|---|---|---|---|---|---|---|---|
| | Reaction Temperature (°C.) | | | | | | | | | | | | | | |
| | 410 | 420 | 430 | 410 | 420 | 430 | 410 | 420 | 430 | 410 | 420 | 430 | 410 | 420 | 430 |
| Products (wt %) | | | | | | | | | | | | | | | |
| $C_1$-$C_4$ Hydrocarbons | 2.7 | 5.6 | 7.7 | 2.3 | 4.5 | 5.9 | 3.5 | 6.1 | 11.4 | 12.5 | 17.0 | 2.1 | 3.1 | 4.9 |
| Naptha | 7.7 | 18.3 | 28.7 | 10.1 | 23.4 | 25.8 | 11.7 | 28.6 | 38.5 | 30.1 | 47.7 | 5.4 | 10.6 | 15.6 |
| Intermediate Fraction | 26.4 | 36.9 | 42.8 | 28.0 | 42.2 | 43.5 | 26.6 | 36.0 | 38.5 | 19.0 | 10.8 | 21.3 | 30.4 | 36.3 |
| 343° C.+ | 63.2 | 41.5 | 21.2 | 55.9 | 28.3 | 21.0 | 55.7 | 29.4 | 11.0 | 37.4 | 23.2 | 66.5 | 51.1 | 38.2 |
| Conversion (wt %) | 34.2 | 56.8 | 77.9 | 41.8 | 70.5 | 81.5 | 43.0 | 69.5 | 88.6 | 59.5 | 74.9 | 30.8 | 46.7 | 60.3 |

TABLE 2

| | Example 3 | Example 4 |
|---|---|---|
| Yield of Intermediate Fraction (wt %) | 35.2 | 32.1 |
| $\Delta H_2$/MD ($Nm^3$/kl*) | 542/1 | 573/1 |
| Denitrogenation Ratio (wt %) | 69.5 | 63.7 |

*Amount of hydrogen consumed for production of 1 kiloliter of intermediate fraction.

What is claimed is:

1. A process for hydrocracking heavy oils comprising contacting said heavy oil with a hydrocracking catalyst deposited on a carrier for hydrocracking said heavy oil, said catalyst deposited on a carrier comprising a carrier consisting of from 20 to 80% by weight of iron-containing aluminosilicate and from 80 to 20% by weight of an inorganic oxide, and (i) a catalyst comprising at least one member of the Group VI B metals and (ii) at least one member of the Group VIII metals of the Periodic Table deposited on the carrier, said iron-containing aluminosilicate having been prepared by steam-treating a crystalline aluminosilicate having a molar ratio of silica to alumina of 4.6 or more and a $Na_2O$ content of not more than 2.4% by weight and contacting said steam-treated crystalline aluminosilicate with an aqueous iron salt solution having a pH of 1.5 or less to form said iron-containing aluminosilicate.

2. The process of claim 1 wherein said inorganic oxide is boehmite gel, alumino sol or silica-alumina gel.

3. The process of claim 1 wherein said catalyst comprises at least one metal selected from the group consisting of tungsten and molybdenum in an amount between 8 and 20% of the total catalyst weight and at least one metal selected from the group consisting of nickel and cobalt in an amount between 1.5 and 8% of the total weight of catalyst.

4. The process of claim 2 wherein said catalyst comprises at least one metal selected from the group consisting of tungsten and molybdenum in an amount between 8 and 20% of the total catalyst weight and at least one metal selected from the group consisting of nickel and cobalt in an amount between 1.5 and 8% of the total weight of catalyst.

5. The process of claim 1 wherein the ratio of said iron-containing aluminosilicate to the inorganic oxide is from 40/60 to 70/30.

6. The process of claim 4 wherein the ratio of said iron-containing aluminosilicate to the inorganic oxide is from 40/60 to 70/30.

7. A process for hydrocracking heavy oils comprising contacting said heavy oil with a hydrocracking catalyst deposited on a carrier for hydrocracking said heavy oil, said catalyst deposited on a carrier comprising a carrier consisting of from 20 to 80% by weight of a molybdenum/iron-containing aluminosilicate and from 80 to 20% by weight of an inorganic oxide, and (i) a catalyst comprising at least one member of the Group VI B metals and (ii) at least one member of the Group VIII metals of the Periodic Table deposited on the carrier, said molybdenum/iron-containing aluminosilicate having been prepared by steam-treating a crystalline aluminosilicate having a molar ratio of silica to alumina of 4.6 or more and a $Na_2O$ content of not more than 2.4% by weight and contacting said steam-treated aluminosilicate with a molybdenum compound to form a molybdenum-containing aluminosilicate and contacting said molybdenum-containing aluminosilicate with an aqueous iron salt solution having a pH of 1.5 or less to form said molybdenum/iron-containing aluminosilicate.

8. The process of claim 7 wherein said molybdenum/iron-containing aluminosilicate contains molybdenum calculated as $MoO_3$ in an amount of from 0.5 to 10% by weight of said molybdenum/iron-containing aluminosilicate.

9. The process of claim 8 wherein said inorganic oxide is boehmite gel, alumino sol or silica-alumina gel.

10. The process of claim 8 wherein said catalyst comprises at least one metal selected from the group consisting of tungsten and molybdenum in an amount between 8 and 20% of the total catalyst weight and at least one metal selected from the group consisting of nickel and cobalt in an amount between 1.5 and 8% of the total weight of catalyst.

11. The process of claim 9 wherein said catalyst comprises at least one metal selected from the group consisting of tungsten and molybdenum in an amount between 8 and 20% of the total catalyst weight and at least one metal selected from the group consisting of nickel and cobalt in an amount between 1.5 and 8% of the total weight of catalyst.

12. The process of claim 7 wherein the ratio of said molybdenum/iron-containing aluminosilicate to the inorganic oxide is from 40/60 to 70/30.

13. The process of claim 11 wherein the ratio of said molybdenum/iron-containing aluminosilicate to the inorganic oxide is from 40/60 to 70/30.

* * * * *